Feb. 25, 1969                J. T. STOICA                3,429,228
                        FRICTION-FREE FLUID METER
                         Filed Nov. 30, 1966

INVENTOR
JOHN T. STOICA
BY
HOWARD J. BARNETT
Attorney

United States Patent Office

3,429,228
Patented Feb. 25, 1969

---

3,429,228
FRICTION-FREE FLUID METER
John T. Stoica, North East, Pa., assignor to A. O. Smith Corporation, Milwaukee, Wis., a corporation of New York
Filed Nov. 30, 1966, Ser. No. 597,990
U.S. Cl. 91—58                                      8 Claims
Int. Cl. F01c *1/00, 21/16;* F16c *25/02*

---

ABSTRACT OF THE DISCLOSURE

A petroleum meter of the rotating vane, positive displacement type mounted on a non-rotating, adjustable horizontal shaft. A rotor positioning means incorporating a ball trapped between a pair of special adjusting screws is provided in the hollow end of the rotor shaft. The meter is designed so that it can be adapted for use in either a vertical or horizontal run.

---

Background of the invention

This invention relates to rotary vane type volumetric flow meters for measuring a quantity of petroleum being transferred through a line. The meter has a horizontal axis of rotation and incorporates a means for adjusting and locking the rotor in relation to the end walls of the meter housing. The housing can be oriented so that the meter can be included in either a horizontal or vertical run. The axis of rotation remains horizontal in either application.

Meters of the rotating vane type have previously been made with a vertical axis of rotation, such as is shown in U.S. Patent 2,911,955. Such a construction requires a thrust bearing and the entire weight of the rotor assembly is suspended from a single thrust bearing in the uppermost part of the rotor in the rotor gear plate. In addition, blade rollers are required for the vertical shaft meter to support the rotor vanes during their reciprocating motion.

The vertical shaft rotary meter cannot be converted from a horizontal run meter to a vertical run meter with the ease and simplicity inherent in the assembly of the subject invention. It would be necessary to bring the flow line in from the side in the typical vertical axis meter. This not only requires additional elbow fittings, but it also takes extra space because the assembly is necessarily wider.

A horizontal axis rotary vane meter is described in U.S. Patent 2,627,848, which shows an adjustment means for adjusting the rotor position in relation to the stationary cooperating parts such as the meter casing. However, in the subject patent, the spring load which causes the rotor to re-position in response to the adjuster transmits the load through the rotating portion of the main ball bearings, and therefore, accelerates wear because the bearings are subjected to a combination of both radial and thrust loads.

Summary of the invention

This invention is directed to a rotary vane type meter having a horizontal axis of rotation which eliminates the requirement for thrust bearings and blade rollers because the complete weight of the rotor assembly is equally distributed between a pair of radial bearings disposed on the horizontally disposed, stationary shaft. This invention includes a simple, balanced adjusting means for positioning the rotor to within close tolerance of the meter housing.

In addition, the meter housing is easily modified to adapt the meter for use in either a horizontal run or a vertical run application. The modification can be made within limited space requirements because the meter rotational axis is horizontal.

The adjustment means includes a spring biased sleeve disposed around the meter shaft. An annular radial bearing is disposed adjacent the sleeve on the meter shaft. A thrust collar having a pair of elongated openings therein is disposed on the shaft just outwardly from the bearing, and the bearing is moved along the shaft in response to change in position of the spring biased sleeve and the thrust collar. The corresponding end of the rotor is provided with a hub member surrounding the adjustable radial bearing, and the relative position of the rotor on the meter shaft is therefore established by the position of the adjustable radial bearing. An adjusting pin is disposed transversely in an elongated slot in the rotor shaft, and also extends through the elongated openings in the thrust collar to urge the radial bearing and the sleeve against the spring and thereby position the rotor. The transversely disposed adjusting pin is urged against the sleeve by a special set screw having a flat inner end and which is threaded in the hollow end of the meter shaft.

The special set screw is locked in place by a socket jam screw, and a steel ball disposed between the special set screw and the socket jam screw. The ball transmits a low torque, locking or wedging force into the threads of the first set screw to firmly lock the special set screw, the adjusting pin, and the thrust collar in the adjusted position relative to the spring biased sleeve. The ball provides an excellent adjustment locking means because it does not develop radial torque when being forced axially against the first set screw by the tightening of the second set screw, and the tolerance setting which has been initially established is in no way disturbed by the insertion of the locking means. Once the correct tolerance has been established, there are no unbalanced forces which cause bearing wear or which work towards misadjustment of the rotor vanes on the shaft, and a substantially friction-free meter results.

Description of the preferred embodiment

Figure 1:
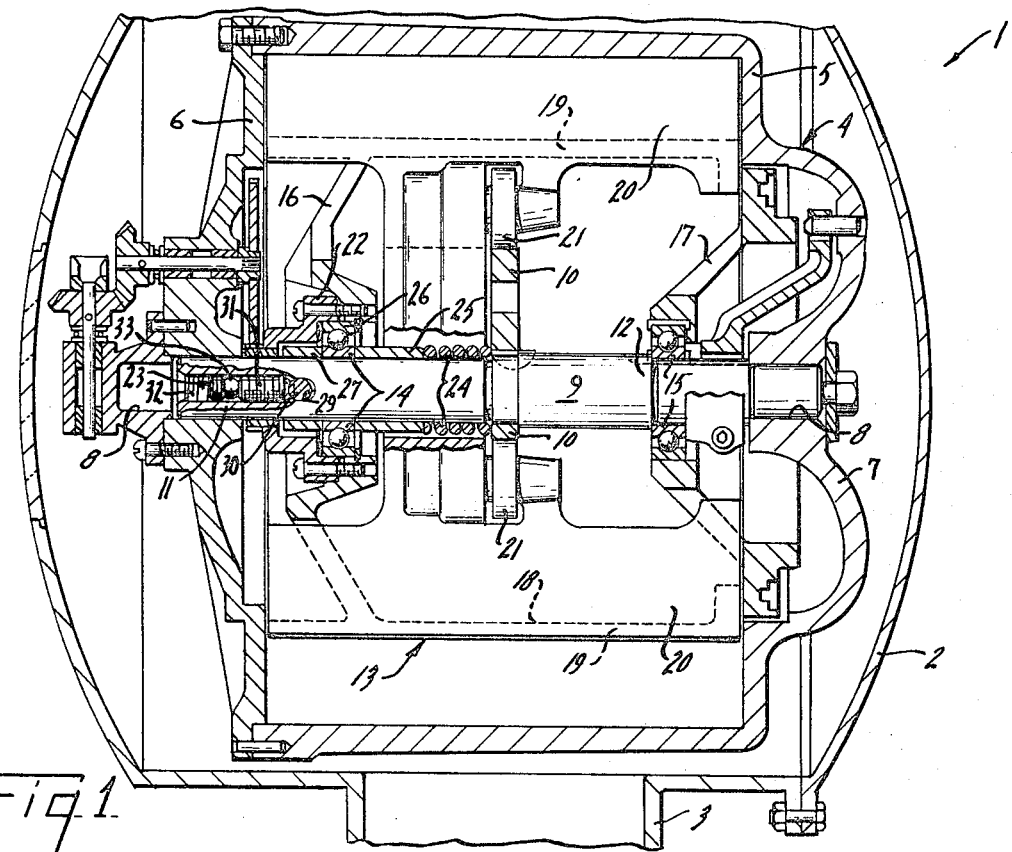
FIGURE 1 of the drawings is a vertical longitudinal section showing the overall assembly of the meter.
Figure 2:
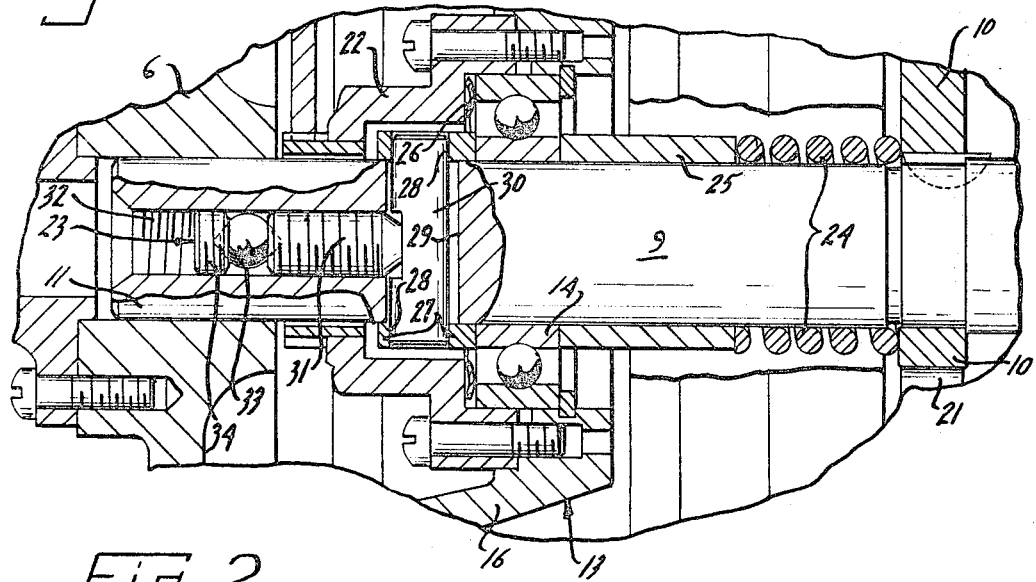
FIG. 2 is an enlarged sectional view with parts broken away of the adjustment mechanism of the invention.

As shown in the drawings, the meter 1 is assembled in an outer housing 2. The configuration of the particular outer housing 2 illustrated is for a "vertical run" application, and an inlet conduit 3 is shown at the bottom of the outer housing 2. An outlet conduit (not shown), which is similar to the conduit 3 is disposed at the top of the outer housing 2.

A meter assembly 4 is disposed inside the outer housing 2, and comprises an inner housing 5 including a first removable end 6 and a second integral end 7. Each end includes a central opening 8 for receiving and supporting a non-rotating rotor shaft 9 in a horizontal plane. A fixed cam 10 is provided on the shaft 9 intermediate ends 11 and 12 thereof. A rotor assembly 13 is disposed and supported on the shaft 9 by means of radial bearings 14 and 15, respectively.

The rotor assembly 13 includes first and second hub members 16 and 17 which support a rotor 18. The rotor 18 is provided with slots 19 which enclose rotor vanes 20. The rotor vanes 20 are each provided with rollers 21 which ride on the cam 10 to reciprocate the rotor vanes 20 towards and away from the inner housing 5.

The first hub 16 is provided with a bearing housing 22 which houses the annular radial bearing 14 mounted on the rotor shaft 9. A second annular radial bearing 15 is disposed in the hub 17 at the other end of the rotor shaft 9.

A rotor adjusting assembly 23 is provided at the first end 6 of the shaft 9. The adjustment assembly comprises a rotor spring 24 disposed on the shaft 9, its inner end resting against the opposed vertical surface of the fixed cam 10. Outwardly on shaft 9 from the rotor spring 24 is a spacer sleeve 25, and the radial bearing 14 rests against the sleeve 25. A wavy spring 26 is provided just outwardly from the bearing 14, and an annular thrust collar 27 having a pair of elongated openings 28 extending transversely therethrough is disposed outwardly from the wavy spring 26.

The rotor shaft 9 has a transverse elongated opening 29 extending therethrough which is aligned with the openings 28 of the thrust collar 27 when the apparatus is assembled. A rotor positioning pin 30 extends through the thrust collar 27 and the shaft 9 in the assembled condition to position the radial bearing 14, and thereby the rotor 18, against the biasing force of the rotor spring 24.

The rotor positioning pin 30 is urged against the biasing force of the rotor spring 24 by a special set screw 31, and this is accomplished by first turning the special set screw 31 into a threaded axial opening 32 in the shaft 9 until the rotor positioning pin 30 bottoms against the transverse elongated opening 29 in the shaft 9. The special set screw 31 is then backed off approximately half the distance so that the rotor 18 is axially positioned with equal clearances at either end between the rotor 18 and the ends 6 and 7 of the inner housing 5.

A steel ball 33 is then dropped into the threaded axial opening 32 of the shaft 9. A socket jam screw 34 is then tightened down on the ball 33 to wedge and lock the special set screw 31 in place. The ball 33 transmits only the axial load from the socket jam screw 34 so that the correct clearances are preserved between the rotor and the ends 6 and 7 of the inner housing 5.

The radial bearing 14 is not subjected to any axial thrust since it is balanced between the rotor positioning spring 24 and the thrust collar 27. The rotor hub 16 surrounds the radial bearing 14 and any axial adjustment movement of the bearing 14 therefore is transmitted into an axial adjustment in the position of the rotor 18. The rotor vanes 20 are assembled in the slots 19 in the rotor 18 and are held in position by the slots 19 and the ends 6 and 7 of the inner housing 5. The reciprocating cam controlled movement of the vanes is well known and is described in U.S. Patent 2,911,955.

I claim:

1. In a rotary vane type meter having an outer housing and a horizontal axis of rotation and having a rotor assembly supported within the housing on a non-rotating shaft by radial bearing means, a rotor position adjustment device comprising means engaging one side of the radial bearing means and biasing the radial bearing means and rotor assembly axially in one direction along said shaft, and a mechanical adjusting device disposed in said non-rotating shaft and having means extending outwardly of the shaft and acting axially against the opposite side of said radial bearing means to thereby counterbalance the biasing means and establish a predetermined optimum clearance between the rotor assembly and the ends of said meter housing.

2. The apparatus of claim 1, in which the meter housing comprises an inner housing assembly adaptable for insertion into both vertical and horizontal run outer meter housings, said rotor supporting shaft remaining horizontally disposed in either adaptation.

3. The apparatus of claim 1, in which the rotor position adjustment device comprises, a spring member encircling said shaft and having one end resting against a fixed stop on said non-rotating shaft, an annular sleeve slidably disposed on said shaft between the radial bearing means and the other end of said spring member and said adjusting device compressing said spring to establish the position of said rotor assembly on the non-rotating shaft.

4. The apparatus of claim 3, including means locking the adjusting device in a predetermined adjustment position.

5. In a cam operated, reciprocating rotary vane, positive displacement meter having a central staitonary shaft and a rotor member mounted on and supported on radial bearings by said shaft, a rotor clearance adjustment device comprising, a helical spring disposed on said shaft and having one end resting against said cam, a sleeve disposed on said shaft at the other end of said spring, radial bearing means disposed on said shaft outwardly adjacent the sleeve, a thrust collar disposed on said shaft just outwardly from said radial bearing means, said thrust collar including a pair of elongated openings therein aligned with an elongated transverse opening in said shaft, rotor positioning pin disposed transversely of said shaft and extending through the elongated opening therein and through the aligned elongated openings in said thrust collar, an axially disposed threaded opening in said shaft extending from the end thereof and communicating with the elongated transverse opening in said shaft, a special set screw having a flat inner end threadably received in said threaded opening in said shaft and urged against said rotor positioning pin to establish precise positioning of said rotor member, a ball disposed outwardly in said threaded opening from said first special set screw and in firm engagement therewith, and a socket jam screw threadably received in said threaded opening just outwardly from said ball and in contact therewith to transmit a low torque, axial wedging and locking force from said socket jam screw through said ball to said special set screw, whereby said rotor member is precisely positioned axially on said shaft and locked in relation to the stationary parts of said meter.

6. The rotary vane type meter of claim 1 wherein said adjusting device includes a first special set screw having a flat inner end, an axially disposed, threaded opening in said shaft receiving said special set screw therein and having means for transmitting the positioning force of said special set screw to position said radial bearing means, a socket jam screw threadably received in said threaded opening, and a ball member disposed between said set screw and said socket jam screw for transmitting only axial locking and wedging force from said socket jam screw to said special set screw thereby locking the shaft mounted member axially on said shaft.

7. In a rotary vane type meter having an outer housing and a horizontal axis of rotation and having a rotor assembly supported within the housing on a non-rotating shaft by radial bearing means, a rotor position adjustment device comprising means engaging one side of the radial bearing means and biasing the radial bearing means and rotor assembly axially in one direction along said shaft, said shaft having an axial threaded opening and a slot extending therethrough, and a mechanical adjusting device disposed in said rotating shaft and having said means extending outwardly of the shaft including projection elements through said slot into engagement with the opposite side of said radial bearing and acting axially against the opposite side of said radial bearing to thereby counterbalance the biasing means and establish a predetermined optimum clearance between the rotor assembly and the ends of said meter housing, a threaded member disposed behind said adjusting device and threaded into said threaded axial opening, and a ball member disposed between said adjusting device and said threaded member to transmit only axial locking force from said threaded member to said adjusting device.

8. The rotory vane type meter of claim 7 wherein said bearing means includes a single radial bearing having an inner race slidably disposed upon the shaft and an outer race secured to the rotor, a thrust member slidably disposed on said shaft in engagement with said inner race and coupled to said projecting means for positioning relative to said shaft, and said biasing means including a coil spring encircling the shaft to the opposite side of the inner race and acting between said inner race and a stop secured to said shaft.

References Cited

UNITED STATES PATENTS

| | | | |
|---|---|---|---|
| 2,174,728 | 10/1939 | Potdevin | 308—59 X |
| 2,298,022 | 10/1942 | Ringland | 308—58 |
| 2,301,405 | 11/1942 | Holtzmann | 308—69 X |
| 2,683,228 | 7/1954 | Schaefer | 308—59 X |
| 3,067,831 | 12/1962 | Willock | 91—73 X |
| 3,241,457 | 3/1966 | Reed | 91—138 X |

FOREIGN PATENTS 467,596  8/1950  Canada.

EVERETTE A. POWELL, JR., *Primary Examiner.*

U.S. Cl. X.R.

103—136; 308—69